US008188842B2

(12) United States Patent
Otsuka et al.

(10) Patent No.: US 8,188,842 B2

(45) Date of Patent: May 29, 2012

(54) STATIONARY REMOTE CONTROL TRANSMITTER

(75) Inventors: Kenji Otsuka, Tokyo (JP); Ryuhei Noguchi, Tokyo (JP); Noriaki Miyata, Tokyo (JP)

(73) Assignee: SMK Corporation, Tokyo (JP)

( * ) Notice: Subject to any disclaimer, the term of this patent is extended or adjusted under 35 U.S.C. 154(b) by 581 days.

(21) Appl. No.: 12/405,376

(22) Filed: Mar. 17, 2009

(65) Prior Publication Data

US 2010/0052938 A1 Mar. 4, 2010

(30) Foreign Application Priority Data

Sep. 1, 2008 (JP) ................................ 2008-224127

(51) Int. Cl.
*G05B 19/02* (2006.01)

(52) U.S. Cl. ............... 340/12.22; 340/686.1; 340/686.3; 340/686.4; 340/12.15; 341/20; 341/22; 341/23; 341/176; 345/168; 345/173; D13/168; D13/173; D13/174; D13/184; D14/218; D14/247; D14/398; D14/400; D14/401

(58) Field of Classification Search ................... 340/1.1, 340/11.1, 9.17, 12.15–12.55, 4.3, 4.11, 426.13, 340/686.3, 13.24, 686.1, 686.4; 341/23–35, 341/171–174, 176; 345/168, 169, 173; 348/734, 348/E7.001

See application file for complete search history.

(56) References Cited

U.S. PATENT DOCUMENTS

| | | | | |
|---|---|---|---|---|
| 6,075,575 | A * | 6/2000 | Schein et al. | 348/734 |
| 7,059,790 | B2 * | 6/2006 | Risheq | 400/491 |
| 2003/0122698 | A1 * | 7/2003 | Horie et al. | 341/176 |
| 2003/0193480 | A1 * | 10/2003 | Nuovo et al. | 345/168 |
| 2003/0222853 | A1 * | 12/2003 | Kim | 345/169 |
| 2006/0181517 | A1 * | 8/2006 | Zadesky et al. | 345/173 |
| 2008/0079604 | A1 * | 4/2008 | Madonna et al. | 340/825.72 |

FOREIGN PATENT DOCUMENTS

| | | | |
|---|---|---|---|
| JP | 2001-245371 | A | 9/2001 |
| JP | 2007-036508 | A | 2/2007 |

* cited by examiner

*Primary Examiner* — George Bugg
*Assistant Examiner* — Sisay Yacob
(74) *Attorney, Agent, or Firm* — Edwards Wildman Palmer LLP; Peter C. Schechter; Brian R. Landry

(57) ABSTRACT

The rotation operation plane of the ring-shaped operation members that operate the rotation is inclined with respect to the horizontal plane so that the rotation operation of the ring-shaped operation member can be performed without holding a finger in the vertical direction. Furthermore, since the rotation operation plane is inclined with respect to the placement plane of the case, static friction on the placement plane is generated by a force component of the operation force acting on the rotation operation plane and is perpendicular to the placement plane, thus the case does not move toward the rotation operation direction during the rotation operation.

2 Claims, 7 Drawing Sheets

STATIONARY REMOTE CONTROL TRANSMITTER

CROSS REFERENCE TO RELATED APPLICATION

This application claims priority under 35 U.S.C. §119 to Japanese Patent Application No. 2008-224127 filed Sep. 1, 2008. The contents of that application, in their entirety, are incorporated herein by reference.

TECHNICAL FIELD

The present invention relates to a stationary remote control transmitter that controls controlled devices by transmitting control data, and more specifically to controlling of the controlled devices by rotation operations of a ring-shaped operation member.

BACKGROUND OF THE INVENTION

Normally, a remote control transmitter that controls Frame Advance, Play and Fast Play of recording in DVD recorders by installing a ring-shaped operation member called the jog dial that freely rotates on a case and by rotating a dial key is known as the remote control transmitter for remotely controlling image playing devices such as DVD recorders (See, Japanese Unexamined Patent Application Publication No. 2007-36508 ("JP '508"), claim 4, page 3, from line 36 to line 50; page 4, from line 26 to line 32, FIG. 1 and FIG. 3).

This remote control transmitter has a rotation detection means that detects the rotation angle of the jog dial, generates control data corresponding to the rotation angle of the jog dial detected by the rotation detection means, transmits the control data embedded in infrared control signals to a DVD recorder that is a controlled device, and controls the frame advance play of recording following the control data.

A remote control transmitter having the case in which input switches for selecting a plurality of controlled devices and controlled contents are installed, transmitting the control data depending on the controlled device selected by the input operation of the input switches, and controlling the controlled device according to the control data is also known (Japanese Unexamined Patent Application Publication No. 2001-245371 ("JP '371"), Abstract, page 5, section 7, line 49 to page 6, section 9, line 9, page 11 line 25 to line 38, FIG. 5).

However, since the remote control transmitter referred in JP '508 needs to transmit infrared control signals by aiming at controlled devices, the longitudinal length of the case is limited to dimensions that can be handled by a single hand, and the installed position and the size of the jog dial are set in such a way that the rotation operation of the jog dial installed on the plane is operable with the thumb of the hand that holds the case. As a result, the size of the jog dial is smaller than the width of the case and the outer diameter of the jog dial also needs to be small so that the rotation operation is possible with the tip of a finger of the holding hand, therefore, there is a problem in operation of the rotation operation of the jog dial in fine angular steps.

In order to solve this problem, as shown in JP '371, if a remote control transmitter transmits control data to a controlled device using radio wave signals, aiming at the controlled device by holding the case with hand is not necessarily needed, thus a stationary-type that is placed on a table can be employed and a freely rotating jog dial with a large outer diameter can be installed on an enlarged case. However, same as the conventional transmitters, for the jog dial having the rotation operation plane that is parallel to the plane of the case, depending on the position relationship between an operator and the remote control transmitter, the elbow of the operator may be raised and the rotation operation is performed by touching it with a finger tip that is pointed in the vertical position, therefore there is a different problem in the operation. On the other hand, if the rotation operation plane of the jog dial is formed along the vertical plane, the operation force for the rotation operation acts parallel to the placement plane of the case, thus the rotation operation may not be operable because the rotation operation plane is separated from the finger tip due to sliding of the case.

For the reasons described above, although the jog dial is suitable as an input means by rotation operation, it has not been used in stationary-type transmitters and its use has been limited in the remote control transmitters that are operated by holding the case with hand.

The present invention has considered these usual problems and its objective is to provide a stationary remote control transmitter that allows the rotation operation of the ring-shaped operation member in fine angular steps, and is excellent in operation of the rotation operation.

A further objective is to add a stationary remote control transmitter that can include a jog dial that is excellent in rotation operation to a group of the stationary-type remote transmitters.

SUMMARY OF THE INVENTION

In order to achieve the objectives described above, the stationary remote control transmitter includes a case having the bottom plane as a horizontal placement plane, an operation member that is installed on the case and freely rotates around a center axis that is perpendicular to the placement plane, a rotation detection means that detects rotational angles of the operation member around the rotation center axis, an operation signal generation means that generates control data for controlling actions of controlled devices using the rotation angle detected by the rotation detection means, and an RF (radio frequency) transmission means that transmits the control data as RF signals to the controlled devices, and forming; an rotation operation plane for rotationally operating the operation member along a tapered plane around said rotation center axis.

Due to a stationary-type with the bottom plane of the case as the placement plane, it is not necessary to consider the rotation operation by holding the case with hand for determining the size of the operation member, thus its diameter can be set to a large size that allows rotation operation in fine angular steps.

Although it is a stationary-type, since the rotation operation plane that performs the rotation operation of the operation member is formed on the tapered plane around the rotation center axis that is perpendicular to the placement plane, it is not necessary to point a finger in the vertical direction for the rotation operation and perform rotational movements, thus the rotational operation can be easily performed.

Further, since the rotation operation plane is inclined with respect to the vertical direction, a force component that acts along the vertical direction that is perpendicular to the placement plane is generated by the operation force that performs the rotation operation of the rotation operation plane, thus the case stands still due to the static friction force generated on the placement plane and thus the rotation operation can be performed without causing the movement of the rotation operation plane.

Furthermore, since the control data are transmitted to controlled devices with RF signals, installing the operation member around the transmission means does not block the transmission of the control data, thus the operation member with a large outer diameter can be installed on the case without necessity of considering the installation position of the transmission means and the installation direction of the controlled devices.

The stationary remote control transmitter can have the operation member that is a ring-shaped and formed around the rotation center axis.

The stationary remote control transmitter can have the display member that displays a plurality of controlled contents for controlling the controlled devices and the input switches that select specific controlled contents controlled by the control data are installed on the plane of the case that is exposed at the center side opening of the ring-shape operation member.

Since the input switches and the display member installed on the case are installed on the case within the ring-shaped operation member, the ring-shaped operation member may have the size that covers whole outline of the plane of the case and can form a large diameter ring-shaped operation member that makes the rotation operation in fine angular steps easy.

Furthermore, since the display member that displays the controlled contents is installed in the center side opening of the ring-shaped operation member that operates the rotation operation, it is possible to operate the rotation operation with monitoring the display of the display member.

The stationary remote control transmitter can have the case that formed in a disk shape around said center axis and has a large diameter disk member having the bottom plane as the placement plane and a small diameter disk member installed above the plane of the large diameter disk member, and the ring-shaped control member that is installed between the first ring guide element formed downward around the outer circumference of the small diameter disk member and the second ring guide element formed upward around the outer circumference of the large diameter disk member, and freely rotates around said center axis.

The ring-shaped operation member is guided along the outer circumferences of the large diameter disk member and the small diameter disk member and is installed on the case in a rotation free manner without installing a rotation axis that supports the ring-shaped operation member at the rotation center.

The stationary remote control transmitter includes a ring-shaped groove formed between the first guide groove having a semicircle cross-section on the plane along the outer circumference of the large diameter disk member and the second guide groove having a semicircle cross-section on the bottom plane of the ring-shaped operation member that faces the first guide element holds a plurality of flexible spacers that are bent in an arc shape to be able to slip along the ring-shaped groove and a plurality of balls that are separated each other by the flexible spacers and roll within the ring-shaped groove, and by guiding the ring-shaped operation member around the center axis in a free rotation manner between the second ring guide element comprising the first guide element of the large diameter disk member and the balls that rotate within the ring-shaped groove and the first ring guide element of the small diameter disk member.

Since the plurality of balls that roll within the ring-shaped groove are separated from each other by a constant interval by the flexible spacers that slide within the ring-shaped groove, the supports of the ring-shaped operation member are distributed.

The flexible spacers are constrained in the ring-shaped groove and naturally bent in an arc shape along the ring-shaped groove.

According to the invention, comparing with the remote control transmitter in which the rotation operation of the operation member is performed by a finger of the hand that holds the case, it is not necessary to hold the case with the hand that performs the rotation operation for the stationary remote control transmitter with the bottom plane of the case as the placement plane, therefore the outer diameter of the operation member can be made large, thus the rotation operation in fine angular steps is possible.

Further, although it is a stationary-type remote control transmitter, the rotation operation of the rotation operation plane of the operation member can be easily performed.

Furthermore, comparing with the transmission means that transmits the control data using infrared signals, it is not necessary to direct the transmission direction toward the controlled device, thus the rotation operation plane of the operation member for controlling the controlled device can be aimed toward any direction.

Since the display member is installed in the center of the ring-shaped operation member that performs the rotation operation, the rotation operation direction and the rotation angle of the ring-shaped operation member that are matched with the controlled contents can be displayed on the display member, thus the rotation operation can be guided without confusion due to the display on the display member.

Since the rotation axis is not installed at the rotation center of the ring-shaped operation member, the display member and the input switches can be installed in the center side opening of the ring-shaped operation member without interfering with the rotation axis.

A large number of the balls can be separately positioned along the circumference direction of the ring-shaped groove in the large diameter disk member or the ring-shaped operation member without forming separation walls for positioning the balls in the ring-shaped groove.

DETAILED DESCRIPTION OF THE INVENTION

In the following, an embodiment of the stationary remote control transmitter 1 of the invention is explained using FIG.

Figure 1:
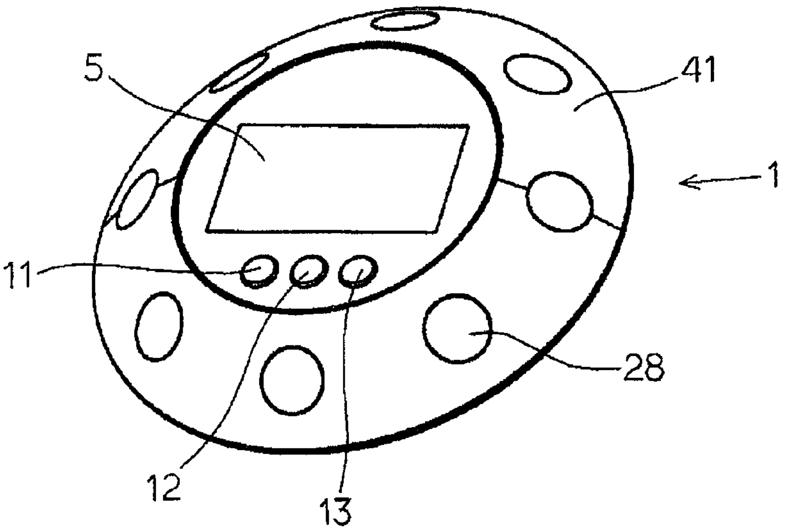
FIG. 1 is a perspective view of the stationary remote control transmitter related to an embodiment of the present invention.
Figure 2:
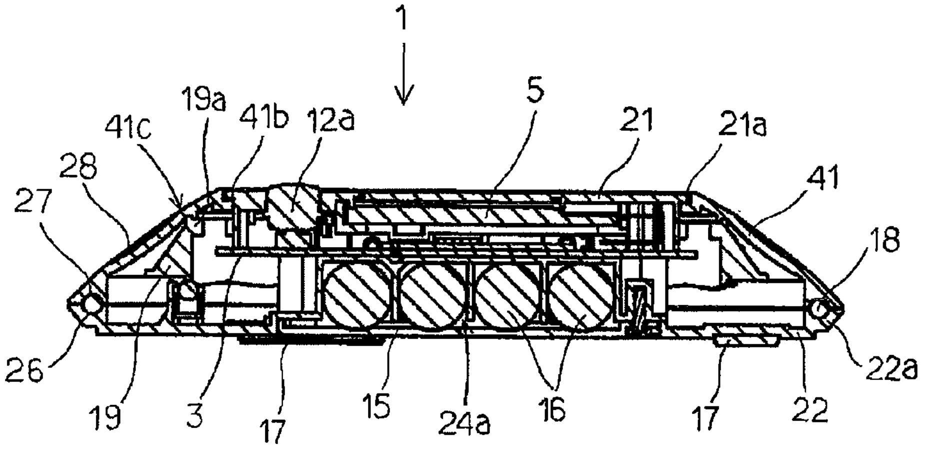
FIG. 2 is a longitudinal cross-sectional view of the stationary remote control transmitter of FIG. 1.
Figure 3:
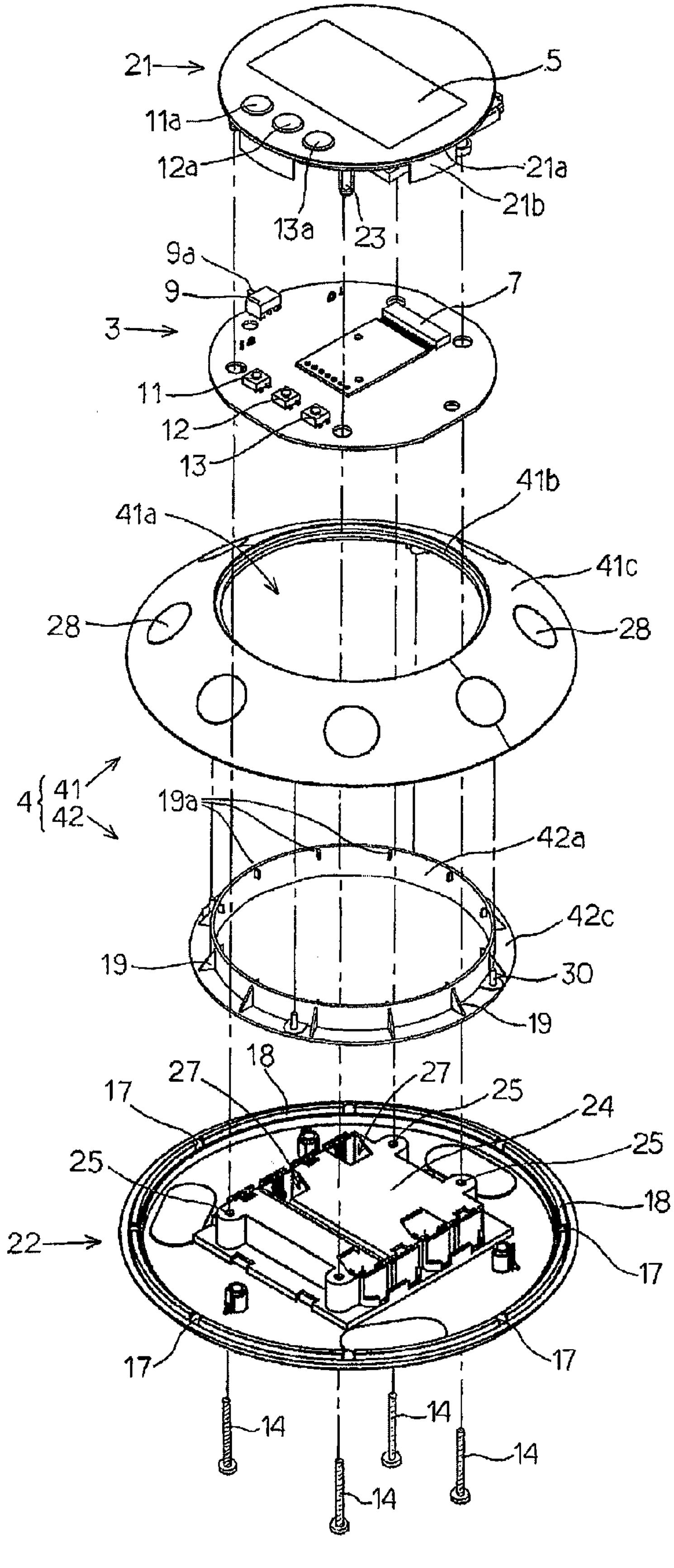
FIG. 3 is an exploded perspective view of each member of the stationary remote control transmitter of FIG. 1 seen from above.
Figure 4:
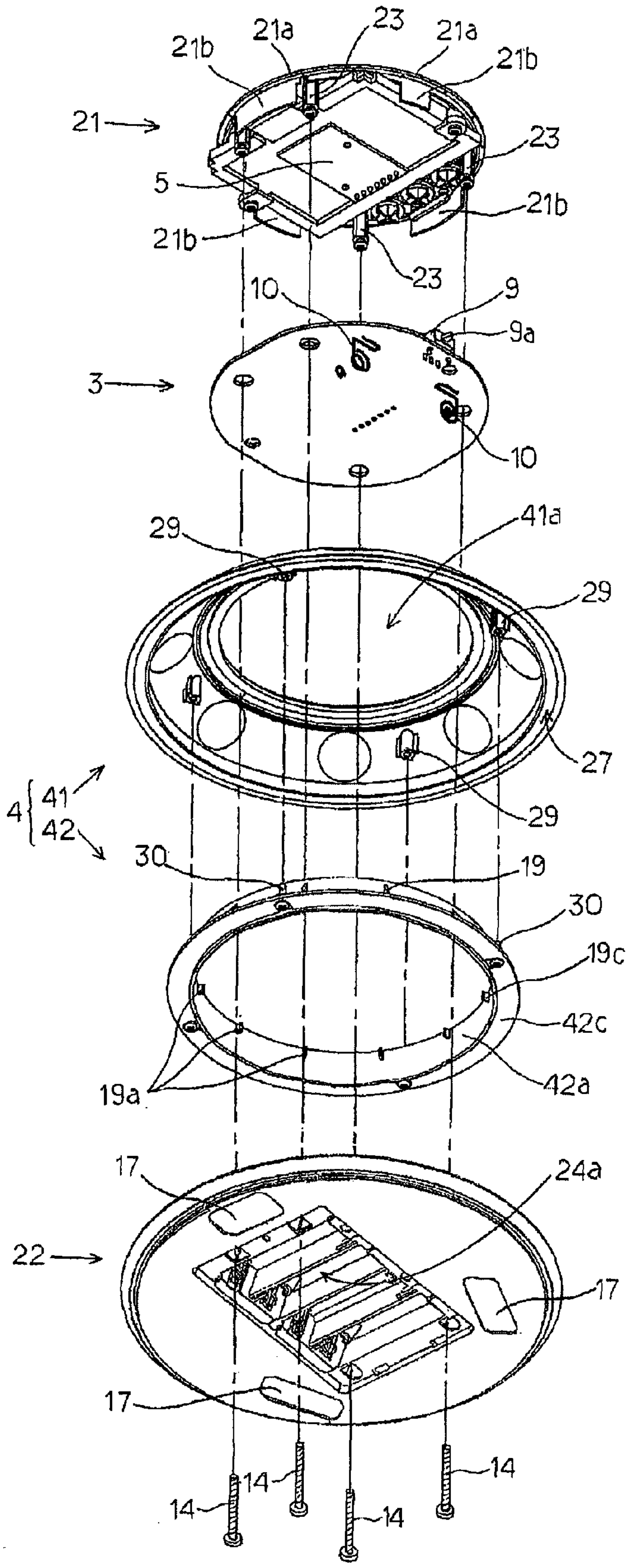
FIG. 4 is an exploded perspective view of each member of the stationary remote control transmitter of FIG. 1 seen from below.
Figure 5:
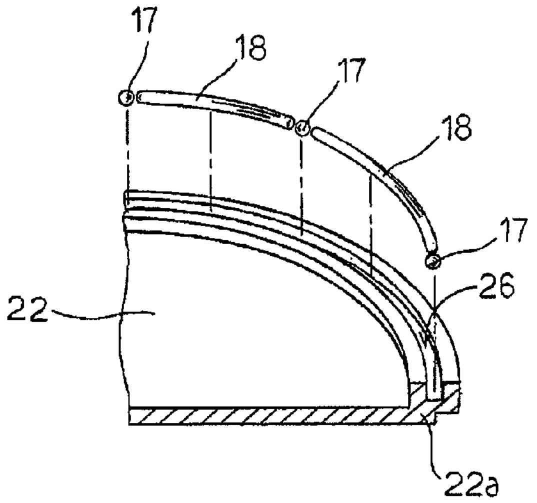
FIG. 5 is a major member enlarged perspective view showing the ring guide element of the large diameter disk member.
Figure 6:
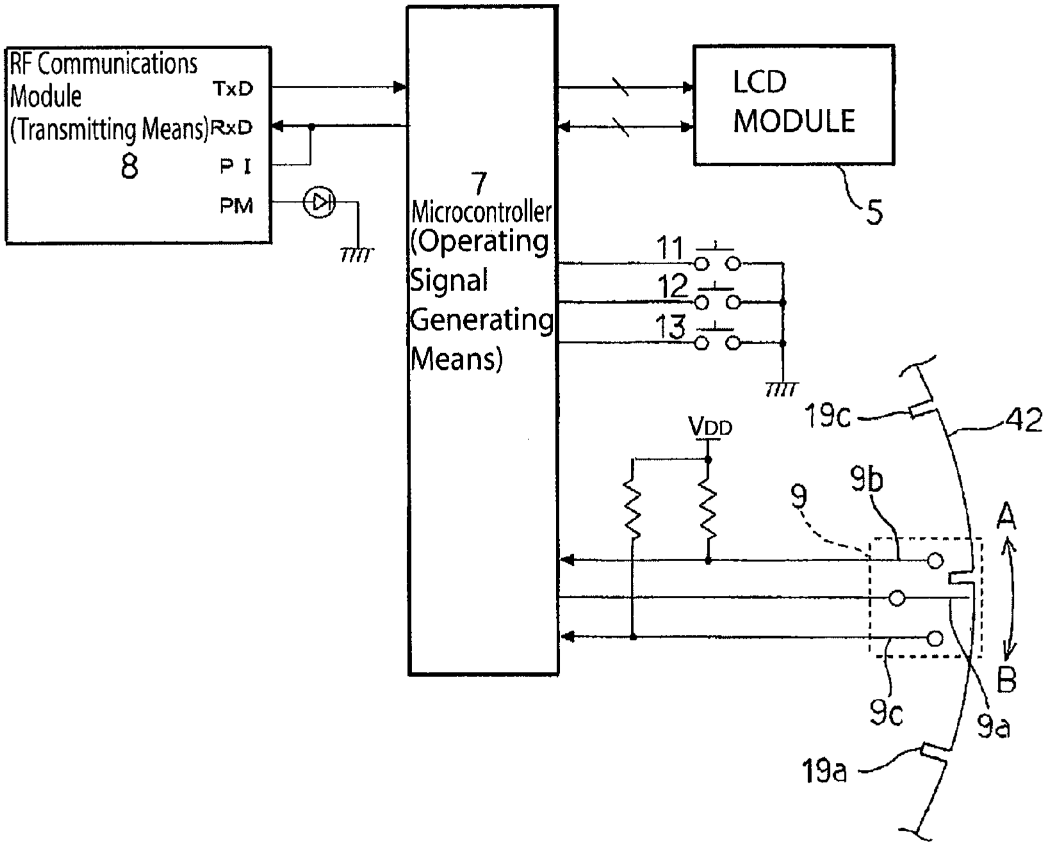
FIG. 6 is block diagram indicating the circuit structure of the stationary remote control transmitter.

1 to FIG. 6. FIG. 1 is a perspective view of the stationary remote control transmitter 1; FIG. 2 is a longitudinal cross-sectional view of the stationary remote control transmitter 1; FIG. 3 is an exploded perspective view seen from above the stationary-type remote control transmitter 1; FIG. 4 is an exploded perspective view seen from below and FIG. 5 is a main part enlarged prospective view showing the ring guide element of the large diameter disk member 22.

As shown in FIG. 3 and FIG. 4, the stationary remote control transmitter 1 includes an insulator case 2 that consists of the small diameter disk member 21 and the large diameter disk member 22, the circular printed circuit board 3 installed between the small diameter disk member 21 and the large diameter disk member 22, the ring-shaped operation member 4 that consists of the ring-shaped jog dial 41 and the driving ring 42, three input switches 11, 12 and 13 that have the operation knobs on the plane side of the small diameter disk member 21, and the liquid crystal display device 5.

The small diameter disk member 21 is made from synthetic resin and is formed in a disk shape, and the liquid crystal display device 5 is installed on its bottom plane (the lower plane in FIG. 2) and the display screen of the liquid crystal display device 5 is placed in the rectangular opening that opens to the plane side. Furthermore, along one side of the rectangular shape opening, the operation knobs 11*a*, 12*a* and 13*a* of the three input switches 11, 12 and 13 that can freely appear or disappear on the plane side are installed over the corresponding switches 11, 12 and 13 installed on the printed circuit board 3 when the printed circuit board 3 is attached to the bottom side.

The outer circumference portion 21*a* of the small diameter disk member 21 has the circular outline, and, at a slightly center side of the bottom side of the outer circumference portion 21*a*, the arc shaped guide elements 21*b* that become the first ring guide member are vertically installed at four locations separated by 90 degrees along the outline of the outer circumference portion 21*a* (refer to FIG. 4). As the cylindrical inner plane of the inner circumference in which the center opening 41*a* of the jog dial 41 is formed, the inner diameter of the upper side of the inner plane through the circular step portion 41 is slightly longer than the outer diameter of the outer circumference portion 21*a* of the small diameter disk member 21, and the inner diameter of the inner plane of the lower side is shorter than the outer diameter of the outer circumference portion 21*a* and is slightly longer than the diameter of the circle formed by the four guide elements 21*b*. As a result, the jog dial 41 inserted into the center opening from the top is restricted from upward movement relative to the small diameter disk member 21 because the outer circumference portion 21*a* touches and contacts to the step portion 41*b*, and at the same time, the inner side plane of the upper side and the inner side plane of the lower side slide along the outer circumference 21*a* of the small diameter disk member 21 and the guide element 21*b*, and is guided in a free rotation manner.

Furthermore, at four positions on the bottom plane of the small diameter disk member 21, the screw holding extrusions 23 in which screw threads are cut on the inner plane of the cylinder are vertically installed and the screws 14 that pass through the printed circuit board 3 and the large diameter disk member 22 are screwed on the screw holding extrusion 23. The outer diameter of the screw holding extrusion 23 is longer than the inserting hole 31 formed at four locations on the printed circuit board 3, thus the distance between the bottom plane of the small diameter disk member 21 that is screwed and the printed circuit board 3 is equal to the height of the screw holding extrusion 23, and this height is taller than the each circuit component installed on the printed circuit board 3, and is the height at which the input switches 11, 12 and 13 touch with the bottoms of the operation knobs that are not pushed.

On the plane of the printed circuit board 3, besides said input switches 11, 12 and 13, the microcomputer 7 that is also the driver of the liquid crystal display device 5 shown in FIG. 5, the RF communication module and the lever-type detection switch 9 are installed. The lever-type detection switch 9 is installed at the circular circumference of the printed circuit board 3 so that the mobile terminal 9*a* that can move along the circular circumference of the printed circuit board 3 extrudes outward in the radial direction from the circumference of the printed circuit board 3. A pair of wire contacts having one end to be connected to the power supply pattern on the plane side is also installed on the bottom plane of the printed circuit board 3.

Figure 9:
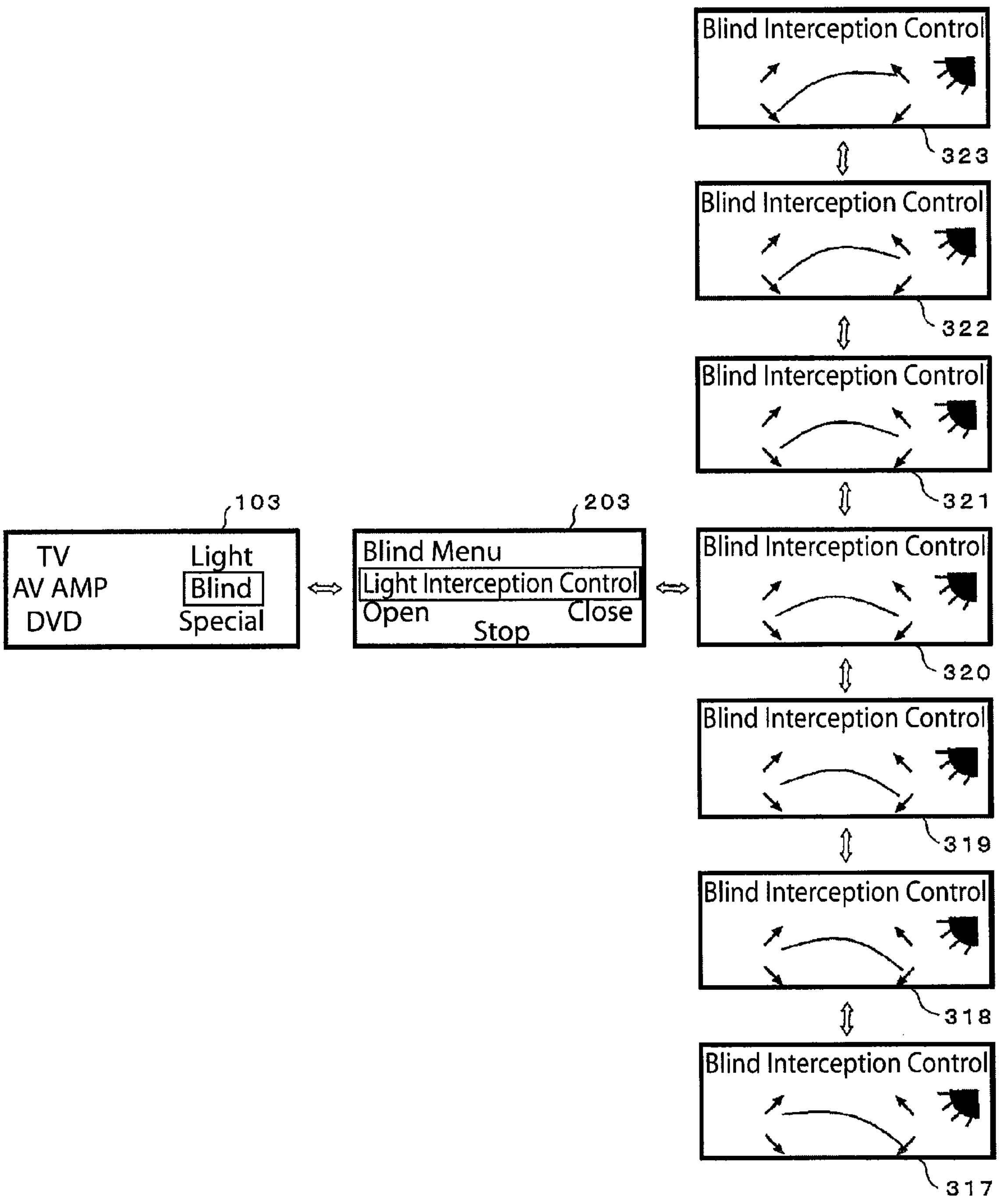
FIG. 9 is an illustration showing the display on the liquid crystal display device for the shading control of a blind.

The large diameter disk member 22 is made from synthetic resin and shaped in a disk shape having the external diameter that is longer than the external diameter of the small diameter disk member 21, and the lower guide groove 26 that has a semicircle cross-section is formed in the concave shape on the plane along the circular circumference portion 22*a* of the circular circumference. As shown in FIG. 3 and FIG. 9, this lower guide groove 26 holds eight balls 17 that roll within the lower guide groove 26 and the arc shaped spacers 18 that maintain interval between the balls 17.

The spacers 18 are formed in a thin wire shape from flexible materials such as silicon that generates low friction force against polymer resin that is the material for the large diameter disk member 22, and is bent in an arc shape along the lower guide groove 26 due to being accommodated in the ring-shaped lower guide groove 26. The lower guide groove 26 of the outer circumference portion 22*a* and the balls 17 form the second ring guide member that guides the jog dial 41 around the center axis in a free rotation manner, and the lower guide groove 26 forms the circular ring groove to roll the balls 17 in combination with the upper guide groove 27 that has a concave shape and is formed on the opposite portion of the jog dial 41 as described later.

The cubic-shaped battery accommodating member 24 is formed as one body at the center of the plane side of the large diameter disk member 22. The battery accommodating concaved portion 24*a* within the battery accommodating member 24 is open to the bottom plane side and accommodates four batteries 16 (refer to FIG. 2) from the bottom plane side. The contact inserting holes 27 for inserting the tip of said pair of wire contacts into the battery accommodating concaved portion 24*a* when the printed circuit board 3 is stacked on the plane side of the large diameter disk member 22 are formed at two locations of the battery accommodating member 24, and the plus electrodes and the minus electrodes of the batteries 16 accommodated in the battery accommodating concaved portion 24*a* are connected each other. As a result, the direct current of four batteries 16 that are connected in series in the battery accommodating the concaved portion 24*a* is supplied to each circuit component installed on the printed circuit board 3 through the contact 10 and the power source pattern on the printed circuit board 3.

At four locations on the circumference of the battery accommodating member 24, the inserting holes 25 for inserting the four screws 14 are also formed and run through up to the bottom plane of the large diameter disk member 22. The opening of the inserting holes 25 at the bottom plane side together with the opening of the battery accommodating concaved portion 24*a*, is covered by the battery cover 15 (refer to FIG. 2) that is screwed on to the bottom side.

The jog dial 41 has the circular center opening 41*a* at its shallow circular dish-shaped top, and as described above, the inner side plane of the inner circumference side that faces the center opening 41*a* prevents the jog dial 41 to fall out upward and also guides around the center axis of the small diameter disk member 21 in a free rotation manner by making the inner diameter of the upper side inner plane through the step 41*b* is longer than the inner diameter of the lower inner side plane and joining the outer circumference portion 21*a* of the small diameter disk member 21 and the guide element 21*b*.

Furthermore, the outer diameter of the jog dial 41 is approximately equal to the outer diameter of the large diameter disk member 22 and, on the bottom plane of the outer circumference portion, the upper guide groove 27 having a semicircle cross-section and the symmetric shape with the lower guide groove 26 of the large diameter disk member 22 is formed along the circular outer circumference portion in a concave shape. As a result, when the jog dial 41 is placed on the large diameter disk member 22 that is on the same center axis line, the upper guide groove 27 and the lower guide groove 26 face each other and form the ring-shaped groove and the plurality of the balls 17 and the spacers 18 are accommodated in a free rolling and sliding manner in the ring-shaped groove, and the jog dial 41 is guided around the center axis of the large diameter disk member 22 in a free rotation manner.

Since the jog dial 41 is guided in a free rotation manner around the center axis in the vertical direction between the second ring guide element of the outer circumference portion 22*a* of the large diameter disk member 22 and the first ring guide element along the outline of the outer circumference portion 21*a* of the small diameter disk member 21, the ring-shaped rotation operation plane 41*c* having the inner circumference as the minor diameter that is the outline of the center opening 41 of the jog dial 41 and the outer circumference as the major diameter is formed in a cone shape without the top section having the slope from the center axis to the outer side downward.

Since the stationary remote control transmitter 1 related to the present embodiment is used by placing on a table by using the bottom plane of the large diameter disk member 22 as the placement plane, the anti-slipping pads 17 are attached to three locations each separated 120 degrees from each other on the bottom plane of the large diameter disk member 22 in order to prevent movement of the stationary remote control transmitter 1 when the input operation is performed. In addition, in the present embodiment, since the rotation operation plane 41*c* that performs rotation operation of the jog dial 41 is inclined with respect to the vertical direction, a force component of the operation force acting on the rotation operation plane acts perpendicular to the placement plane, thus the case 2 does not move during the rotation operation due to static friction force generated on the placement plane.

The circular slipping prevention grooves 28 for preventing slipping of the rotation operation are grooved on the plane of the rotation operation plane 41*a* at an equal angular interval around the center axis, and the positioning cylindrical elements 29 are vertically installed on the bottom plane of the jog dial 41 as one body at the 90 degree interval around the center axis.

The working ring 42 comprises the cylindrical element 42*a* having the inner diameter that is slightly larger than the outer diameter of the printed circuit board 3, and the flange element 42*c* that is extruded horizontally toward the outer side from the bottom plane of the cylindrical element 42*a*. The plurality of bracket elements 19 is fixed in the standing position at equal angular interval around the center axis between the cylindrical element 42*a* and the flange element 42*c*, and the tip of each bracket element 19 becomes the action extrusion 19*a* that runs through the cylindrical element 42*a*.

The positioning extrusion 30 that is inserted in the positioning cylindrical element 29 is installed in the standing position on the plane of the flange element 42 of the working ring 42 that faces the positioning cylindrical element 29 of the jog dial 41, and the working ring 42 is fixed on the bottom plane of the rotation operation plane 41 of the jog dial 41 after the positioning extrusion 30 is inserted in the positioning cylindrical element 29 and by gluing the both elements together using a glue.

In the state where the jog dial 41 with the working ring 42 fixed on the bottom plane is put between the small diameter disk member 21 and the large diameter disk member 22, the assembly of the stationary remote control transmitter 1 that is constructed in a manner described above is put together by inserting four screws 14 from the side of the bottom plane of the large diameter disk member 22 to the crew holding extrusion 23 of the small diameter disk member 21 through the inserting hole 25 of the large diameter disk member 22 and the inserting hole 31 of the printed circuit board 3, and forming into one body by tightening the screws as shown in FIG. 2 and FIG. 3.

In the assembled state with the screws, in order from the top, the small diameter disk member 21, the jog dial 41, the working ring 41, the printed circuit board 3 and the large diameter disk member 22 are positioned around the same center axis, and as shown in FIG. 2, the jog dial 41 is guided in a rotation free manner around the center axis by the first ring guide element of the small diameter disk member 21 and the second ring guide element of the large diameter disk member 22.

Furthermore, the cylindrical element 42*a* of the working ring 42 is installed in a free rotation manner around the lever-type detection switch 9 that is installed on the printed circuit board 3, the mobile terminal 9*a* of the lever-type detection switch 9 is positioned on the same circumference as the action extrusion 19*a* that extrudes into the cylindrical element 42*a*, and as described above, each operation knob 11*a*, 12*a* or 13*a* of the input switch 11, 12 or 13 contacts with the actuators of the input switch 11, 12 or 13 that are installed on the printed circuit board 3.

FIG. 6 is a block diagram showing the circuit parts that make up the stationary remote control transmitter 1, and the lever-type detection switch 9, the input switches 11, 12 and 13, the liquid crystal display device 5 and the RF communication module 8 are connected to the microcomputer 7.

The lever-type switch 9 is a rotation detection device that detects the rotation direction and the rotation angle of the rotation operation of the jog dial 41, and when the rotation operation to one direction (for example the A direction in FIG. 6) of the jog dial 41 is performed, every time when the action extrusion 19*a* that moves toward the rotation direction touches and contacts with the mobile terminal 9*a* of the lever-type detection switch 9, the mobile terminal 9*a* and the fixed terminal 9*b* positioned in the rotation direction contact each other, and a pulse signal is generated due to the contact between the mobile terminal 9*a* and the fixed terminal 9*b*. On the other hand, when the rotation operation on the jog dial 41 is performed in the opposite direction (for example, the B direction in FIG. 6), in the same manner, the mobile terminal 9*a* and the fixed terminal 9*c* positioned in the rotation direction contact each other, and a pulse signal is generated due to the contact between the mobile terminal 9*a* and the fixed terminal 9*c*. The microcomputer 7 determines that the rotation operation is for the A direction when the pulse signal input from the lever-type detection switch 9 is input by the contact between the mobile terminal 9*a* and the fixed terminal 9*b*, or for the B direction when the pulse signal input from the lever-type detection switch 9 is input by the contact between the mobile terminal 9*a* and the fixed terminal 9*c*. Furthermore, since the action extrusion 19*a* is installed at the equal angular interval around the center axis of the jog dial 41, the rotation angle of the jog dial 41 is detected by the number of the generated pulse signals, and the rotation speed is detected by the number of the generated pulse signals per a specified time unit.

Furthermore, since the mobile terminal 9*a* posses elasticity for returning to a neutral position, the action extrusion 19*a* forces the mobile terminal 9*a* to contact either the fixed terminal 9*b* or 9*c* against the elastic force exerted by the mobile terminal 9*a*, so when the action extrusion 19*a* moves over the mobile terminal 9*a*, the elastic force exerted by the mobile terminal 9*a* is released, thus the operator receives clicking feeling and can obtain the rotation operation feeling including the amount of rotation (rotation operation angle).

When the microcomputer 7 receives the pulse signals indicating said rotation operation of the lever-type detection switch and the input of the operation signals of the switches 11, 12 and 13, depending on the input, the microcomputer 7 displays the specific display on the liquid crystal display device 5, and controls the communication operation of the RF communication module. When an operation signal of the input switch 11 is input, the controlled contents such as the controlled device and the controlled actions are selected by the cursor displayed on the liquid crystal display device 5, then the operation signal of the input switch 12 is input, the wireless communication between the controlled device and the RF communication module 8 is performed, then the action state is displayed on the liquid crystal display device 5, then the operation signal of the input switch 13 is input, and the controlled contents that indicates the controlled device and the controlled actions of the controlled device selected by the input switch 11 is cancelled. Furthermore, from the pulse signal of the lever-type detection switch 9, when the controlled actions for controlling the controlled device by the switch 11 is selected by moving the cursor displayed on the liquid crystal display device 5, the control data for controlling the controlled device, depending on the number of the pulse signals, is generated and outputted to the RF communication module 8.

The RF communication module conforms to the UART (Universal Asynchronous Receiver Transmitter) and is connected to the microcomputer with the asynchronous bidirectional communication. Furthermore, the RF communication module conforms to the wireless communication regulation IEEE 802.15, receives commands from the microcomputer 7, receives the action state of the controlled device, then when the control data for controlling the controlled device from the microcomputer 7 is received, transmits the control data to the controlled device by wireless communication, and lets to proceed the action following the control data.

In the following, the actions of the stationary remote control transmitter 1 that is constructed in the way described above are explained using FIG. 7 through FIG. 9. In a standby situation where the stationary remote control transmitter 1 has not been used, the microcomputer 7 is operated in a sleep mode where only the input from the input switches 11, 12 and 13 are detected in order to minimize consumption of the batteries 16.

Figure 7:
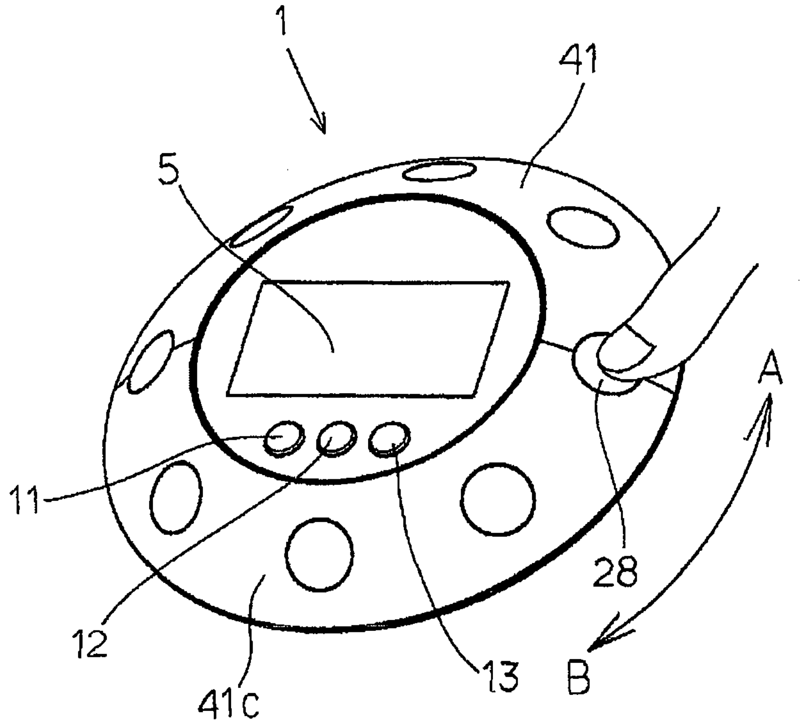
FIG. 7 is a perspective view showing the state of the stationary remote control transmitter of FIG. 1 in use.
Figure 8:
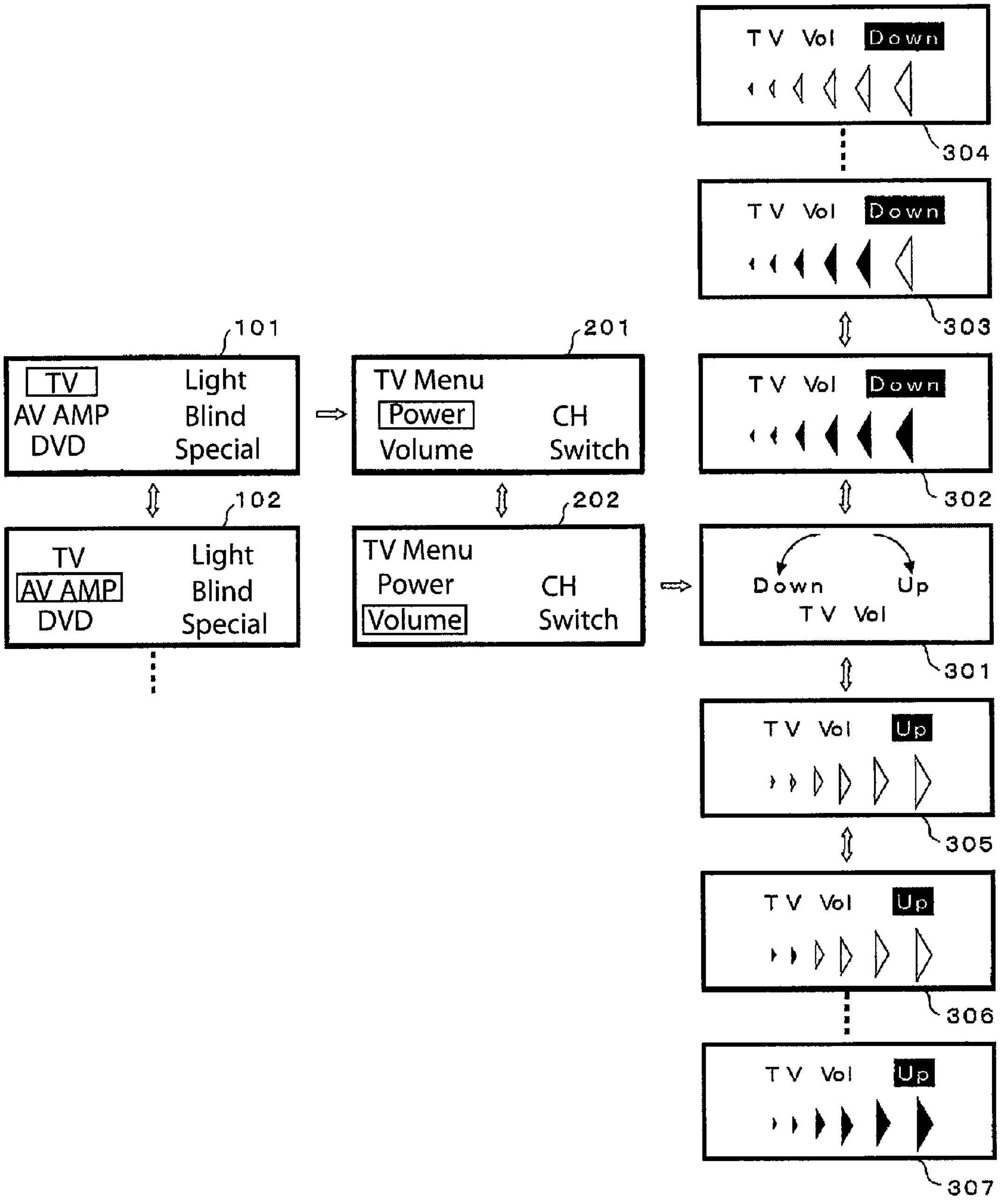
FIG. 8 is an illustration showing the display on the liquid crystal display device for the volume control of TV.

In an initial state where input from either the input switches 11, 12 and 13 or the lever-type detection switch is detected, the main menu indicated by 101 in FIG. 8 is displayed on the liquid crystal display device 5 and the cursor 31 is displayed in reversal at the display position of TV that is one of the controlled devices. The main menu is an input mode for selecting a controlled device to be controlled and the selection of the controlled device is performed by, as shown in FIG. 7, pushing the slip prevention concaved portion 28 formed on the rotation operation plane 41*c* of the jog dial 31 with a finger and rotating around the center axis, and moving the cursor 31 displayed on the liquid crystal display device 5.

The rotation operation of the jog dial 41 can be performed from above or side since the rotation operation plane 41*c* is inclined with respect to the horizontal plane. It also avoids troublesome operations such as performing the rotation operation by lifting an elbow and pointing a finger downward, and furthermore, since the rotation operation plane 41*c* is inclined with respect to the horizontal placement plane of the case 2, a force that is a component of the operation force acting on the rotation operation plane 41*c* and perpendicular to the rotation operation plane is generated, thus static friction force increases and therefore, the case does not move toward the rotation direction. Thus, the rotation operation can be easily performed by pushing the slip prevention groove 28 of the rotation operation plane 41*c* with finger.

The cursor 31 moves on the display screen of the liquid crystal display device 5 in a direction that matches with the rotation direction of the jog dial 41, and for example, when the jog dial 41 performs the rotation operation to the A direction (counter clockwise) in FIG. 7, a plurality of pulse signals generated between the mobile terminal 9*a* and the fixed terminal 9*b* are continuously input in the microcomputer 7, then the microcomputer 7 detects the rotation operation to the A direction and moves the cursor 31 to the display position of the TV amplifier indicated by 102 that is the same direction as the A direction.

The input switch 11 is used for an input operation after moving the cursor 31 to the display position of a controlled device that is intended to be controlled by the similar rotation operation. Here, when the volume of the TV is supposed to be operated, the cursor 31 is moved to the display position of TV in the main menu (101) and the input switch 11 is set ON by the input operation, then the display screen of the liquid crystal display device 5 switches to the input mode (201) of the TV menu. Similar to the main menu, the cursor 31 also moves to the same direction as the rotation operation direction of the jog dial 41, the jog dial 41 performs the rotation operation to the A direction in order to operate the volume, and the input switch 11 performs the input operation under the state where the cursor 31 has been moved to the display position of the volume. As a result, the microcomputer 7 shifts to the control mode where the controlled contents for controlling the TV volume have been selected. In any display screen where the TV menu is displayed, the operation of the input switch 13 brings back the display screen of the main menu (101) that is one layer above.

The input switch 11 performs the input operation when the cursor 31 is on the display position of the volume (202), then the display screen of the liquid crystal display device 5 shifts to the input mode for the volume adjustment (301). In the input mode for the volume adjustment (301), besides the control contents for controlling Up or Down of the volume, the rotation operation direction of the jog dial 41 for performing these controls is shown with an arrow on the liquid crystal display device 5 installed in the center side of the jog dial 41. In other words, since the rotation operation direction of the jog dial 41 that generates the control data of the controlled contents (Up or Down of the volume) is shown with an arrow that is in the center side of the jog dial and around the same center axis, the operator can perform the rotation operation without making mistakes on the rotation operation direction of the jog dial 41 regarding the controlled contents. If the jog dial 41 performs the rotation operation to the A direction, the control data for reducing the volume is transmitted to TV and the volume decreases depending on the rotation angle to the A direction and shifts to the display that decreases the black triangle mark for representing the volume (302 through 304). Similarly, if the jog dial 41 performs the rotation operation to the B direction, the control for increasing the volume of TV is performed and the volume increases depending on the rotation angle to the B direction and shifts to the display that increases the black triangle mark for representing the volume (305 through 307).

Next, the shading control of a blind is assumed to be performed, then the jog dial 41 performs the rotation operation to either the A direction or the B direction on the main menu indicated 101 in FIG. 8, the cursor 31 is moved to the display position of the blind in FIG. 9 (103), and then the input switch 11 performs the input operation. The display screen of the liquid crystal display device 5 shifts to the input mode for the blind menu (203), then the cursor 31 is moved to the shading adjustment in this input mode, if the input switch 11 performs the input operation, the input mode for the shading control that indicates the direction of open or close of the blind is displayed. At the same time, the microcomputer 7 shifts to the control mode that has the controlled contents for controlling the shading adjustment of the blind.

In the input mode (320) for the blind shading adjustment, the state of opening/closing viewed from the blind side is displayed on the liquid crystal display device 5 and this opening/closing direction is matched with the opening/closing direction performed by the rotation operation of the jog dial 41. In other words, if the jog dial 41 performs the rotation operation to the A direction that is counter clockwise, the blind is rotationally controlled in the counter clockwise direction when viewed from the right hand side and the gaps of the blind become narrow and the shading progresses, or if rotationally operated to the B direction, i.e., the clockwise direction, the blind is rotationally controlled in the clockwise direction and the gaps of the blind widens and lighting progresses.

Furthermore, the blind is rotationally controlled in proportion to the rotation angle of the jog dial 41 and when the jog dial 41 is rotationally operated to the A direction, the blind is rotationally controlled in the left turn direction according to the rotation angle and the display of the liquid crystal display device 5 shifts to the display that shows the blind gradually rotates in the left turn direction (from 317 to 323 direction in FIG. 9). On the other hand, rotationally operated to the B direction, the blind is rotationally controlled in the right turn direction according to the rotation angle and the display of the liquid crystal display device 5 shifts to the display that shows the blind gradually rotates in the right turn direction (from 323 to 317 direction in FIG. 9).

The jog dial 41 related to the present embodiment has the size that covers whole circumference of the plane of the case 2, can install a plurality of action extrusions 19*a* at equal angular interval around the center axis, makes rotation operation in fine angular steps easy due to the jog dial 4 having a large outer diameter, detects the fine rotation angle of the jog dial 41 using the microcomputer 7, and performs fine rotation control by displaying the state on the liquid crystal display device 5.

Although the rotation operation plane 41*c* of the jog dial 41 is formed along the tapered plane that is inclined downward from the center to the outer side in the embodiment described above, if it is a tapered plane, it can be formed on the tapered plane that is inclined downward from the outer side to the center.

Furthermore, the input switches 11, 12, and 13 and the liquid crystal display device 5 that are installed on the case 2 that faces the center opening 41*a* of the ring-shaped operation member 4 in the embodiment described above may be installed in different positions other than the ring-shaped operation member 4.

Furthermore, it is not necessary for the operation member to be formed in the ring-shaped, and a circumference shape that covers whole plane of the case 2 without having the opening at the rotation center axis side can be employed.

The present invention is suitable for the stationary remote control transmitter that controls the controlled devices by rotation operation of the ring-shaped operation member.

We claim:

1. A stationary remote control transmitter comprising:
- a case having a bottom plane as a horizontal placement plane, the case comprising:
  - a large diameter disk member having the bottom plane in the same plane as the horizontal placement plane; and
  - a small diameter disk member installed above the bottom plane of the large diameter disk that is formed in disk shapes around said center axis;
- an operation member installed in the case, which freely rotates around a center axis that is perpendicular to the placement plane, wherein the operation member is formed in a shape of a ring around the center axis, wherein the operation member is installed between a first ring guide element formed downward around the outer circumference of the small diameter disk member and a second ring guide element formed upward around the outer circumference of the large diameter disk member, and freely rotates around the center axis;
- a rotation detection device detecting rotational angles of the operation member around the rotation center axis;
- an operation signal generation device generating control data for controlling actions of the controlled device utilizing the rotation angles detected by the rotation detection device;
- an RF transmission device transmitting the control data as RF signals to the controlled device; and
- a rotation operation plane for rotationally operating the operation member along a tapered plane around said rotation center axis;
- a ring-shaped groove that is formed between a first guide groove having a semicircle cross- section on the plane along the outer circumference of the large diameter disk member and a second guide groove having a semicircle cross-section on the bottom plane of the operation member that faces the first guide groove, and holds a plurality of flexible spacers that are bent in an arc shape to be able to slip along the ring-shaped groove; and
- a plurality of balls that are separated from each other by the flexible spacers and roll within the ring-shaped groove, and guiding the operation member in a free rotation manner around the center axis between the second ring guide element of the large diameter disk member and the balls that rotate within the ring-shaped groove, and the first ring guide element of the small diameter disk member.

2. The stationary remote control transmitter of claim 1, further comprising:
- a display member displaying plurality of controlled contents for controlling the controlled devices; and
- input switches selecting a specific controlled content controlled by control data are installed on a plane of the case that is exposed at an opening on the center side of the operation member.

* * * * *